(12) United States Patent
Yoshida et al.

(10) Patent No.: US 7,792,283 B2
(45) Date of Patent: Sep. 7, 2010

(54) PANEL ATTACHMENT ASSEMBLY, PANEL ATTACHMENT METHOD AND TELEPHONE

(75) Inventors: Shinichi Yoshida, Hachioji (JP); Kenji Nitobe, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 412 days.

(21) Appl. No.: 11/896,026

(22) Filed: Aug. 29, 2007

(65) Prior Publication Data
US 2008/0056486 A1 Mar. 6, 2008

(30) Foreign Application Priority Data
Aug. 30, 2006 (JP) ............... 2006-233797

(51) Int. Cl.
*H04M 9/00* (2006.01)
*H04M 1/00* (2006.01)
(52) U.S. Cl. .................. 379/428.04; 379/440
(58) Field of Classification Search ...............
379/428.01–428.04, 454, 440
See application file for complete search history.

(56) References Cited

U.S. PATENT DOCUMENTS

| 4,375,584 | A | * | 3/1983 | Muzumdar et al. | ..... 379/428.04 |
|---|---|---|---|---|---|
| 4,773,090 | A | * | 9/1988 | Goatman | ..... 379/429 |
| 6,038,311 | A | * | 3/2000 | Nitobe et al. | ..... 379/428.03 |
| 6,970,556 | B2 | * | 11/2005 | Wall et al. | ..... 379/355.09 |
| 7,054,423 | B2 | * | 5/2006 | Nebiker et al. | ..... 379/201.01 |
| 7,519,176 | B2 | * | 4/2009 | Akatsu | ..... 379/428.04 |

FOREIGN PATENT DOCUMENTS

| JP | 5-27722 U | 4/1993 |
|---|---|---|
| JP | 2000-305477 | 11/2000 |
| JP | 2005-091682 | 4/2005 |

* cited by examiner

*Primary Examiner*—Fan Tsang
*Assistant Examiner*—Phylesha Dabney
(74) *Attorney, Agent, or Firm*—Pillsbury Winthrop Shaw Pittman, LLP (57) ABSTRACT

According to one embodiment, a panel attachment assembly comprises a housing including a first wall with an opening, a cover panel fitted in the opening, and a built-in component fixed in the housing. The housing includes a first end edge defined by the first and second walls, and a second end edge defined by the first and third walls. The cover panel includes a first end face aligned with the first end edge and seen from the outside, a second end face aligned with the second end edge and seen from the outside, and flanges projecting from side edges. The built-in component has engagement sections at positions corresponding to ends of the flanges. These ends of the flanges contact the engagement sections, and the other ends contact the housing between the first wall and built-in component.

16 Claims, 6 Drawing Sheets

PANEL ATTACHMENT ASSEMBLY, PANEL ATTACHMENT METHOD AND TELEPHONE

CROSS-REFERENCE TO RELATED APPLICATIONS

This application is based upon and claims the benefit of priority from Japanese Patent Application No. 2006-233797, filed Aug. 30, 2006, the entire contents of which are incorporated herein by reference.

BACKGROUND

1. Field

One embodiment of the invention relates to a panel attachment assembly and method for fixing, to a housing, a cover panel for covering, for example, a liquid crystal display panel. It also relates to a telephone with a liquid crystal display panel and a cover panel for covering the liquid crystal display panel.

2. Description of the Related Art

Office or home telephones incorporate a display for displaying, for example, a telephone number, calendar, time, and dialing/incoming states. Displays have a liquid crystal display panel fitted in a housing, a rectangular opening formed in the upper surface of the housing, and a transparent cover panel held in the opening by a holding frame (see, for example, Jpn. Pat. Appln. KOKAI Publication No. 2000-305477).

The opening is defined by four edges and positioned at an easily viewable position on the upper surface of the housing. The holding frame holds the outer periphery of the cover panel and is fitted in the opening. As a result, the cover panel faces the display surface of the liquid crystal display panel. The display surface can be seen from the outside of the telephone via the cover panel.

In the conventional display, the edges defining the opening are provided on the upper surface of the housing, therefore the size of the cover panel may be limited, or the outward design of the telephone may be limited. In view of this, in recent years, it has been attempted to extend the opening of the housing so as to open at a corner defined by the upper surface and a side surface of the housing, and to expose an end face of the cover panel through the extended opening. This structure can enhance the flexibility in design of the display.

When the end face of the cover panel is exposed to the outside through the opening, the outer periphery of the cover panel cannot be held by a holding frame. In this case, to fix the cover panel to the housing, it is possible, for example, to adhere an end of the cover panel to the housing by an adhesive, or to provide an engagement claw on the back surface of the cover panel and engage the claw with the housing.

However, the fixing method of adhering the cover panel to the housing requires the process of coating an adhesive on the cover panel or housing, which increases the manufacturing cost of the display. Furthermore, once the cover panel is adhered to the housing, it cannot easily be exchanged for another.

In addition, since the cover panel is made transparent so that the display surface of the liquid crystal display panel can be seen from the outside of the telephone, the adhesive or engagement claw will be seen from the outside through the transparent cover panel. This is not preferable in outward appearance.

Moreover, since the engagement claw projects from the back surface of the cover panel, it is difficult to make the entire back surface flat. As a result, if it has come to be necessary to mask a certain area on the back surface of the cover panel, the back surface cannot be subjected to coating or printing since the engagement claw is in the way.

Therefore, to mask the cover panel, it is necessary to interpose a dedicated masking sheet or decoration sheet between the cover panel and housing, which inevitably increases the number of required components and accordingly the manufacturing cost.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, a panel attachment assembly comprises a housing including a first wall with an opening formed therein, a second wall extending from an end of the first wall and intersecting the first wall, and a third wall extending from another end of the first wall and intersecting the first wall, the opening being formed by a first end edge defined by the first and second walls, and a second end edge defined by the first and third walls; a cover panel fitted in the opening, the cover panel including a first end face aligned with the first end edge and seen from an outside of the panel attachment assembly, and a second end face aligned with the second end edge and seen from the outside of the panel attachment assembly; and a built-in component contained in and fixed to the housing and opposing the cover panel within the housing.

The cover panel further includes a pair of side edges extending between the first and second end faces, and flanges projecting from the side edges and positioned between the first wall of the housing and the built-in component, the built-in component having engagement sections at positions corresponding to ends of the flanges.

The ends of the flanges contact the engagement sections between the first wall and the built-in component, other ends of the flanges contacting the housing between the first wall and the built-in component.

Figure 1:
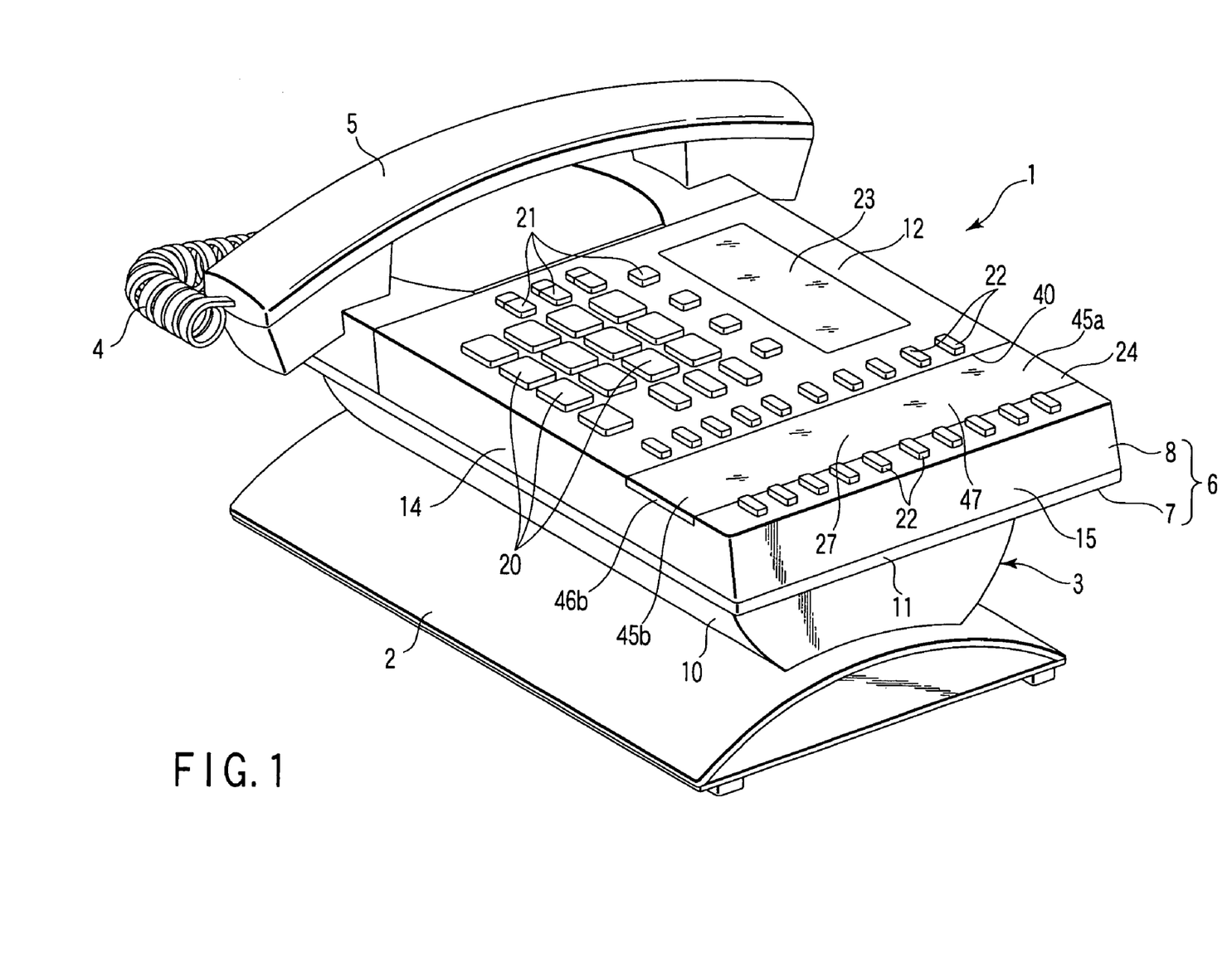
FIG. 1 is a perspective view illustrating an exemplary telephone according to an embodiment of the invention.
Figure 2:
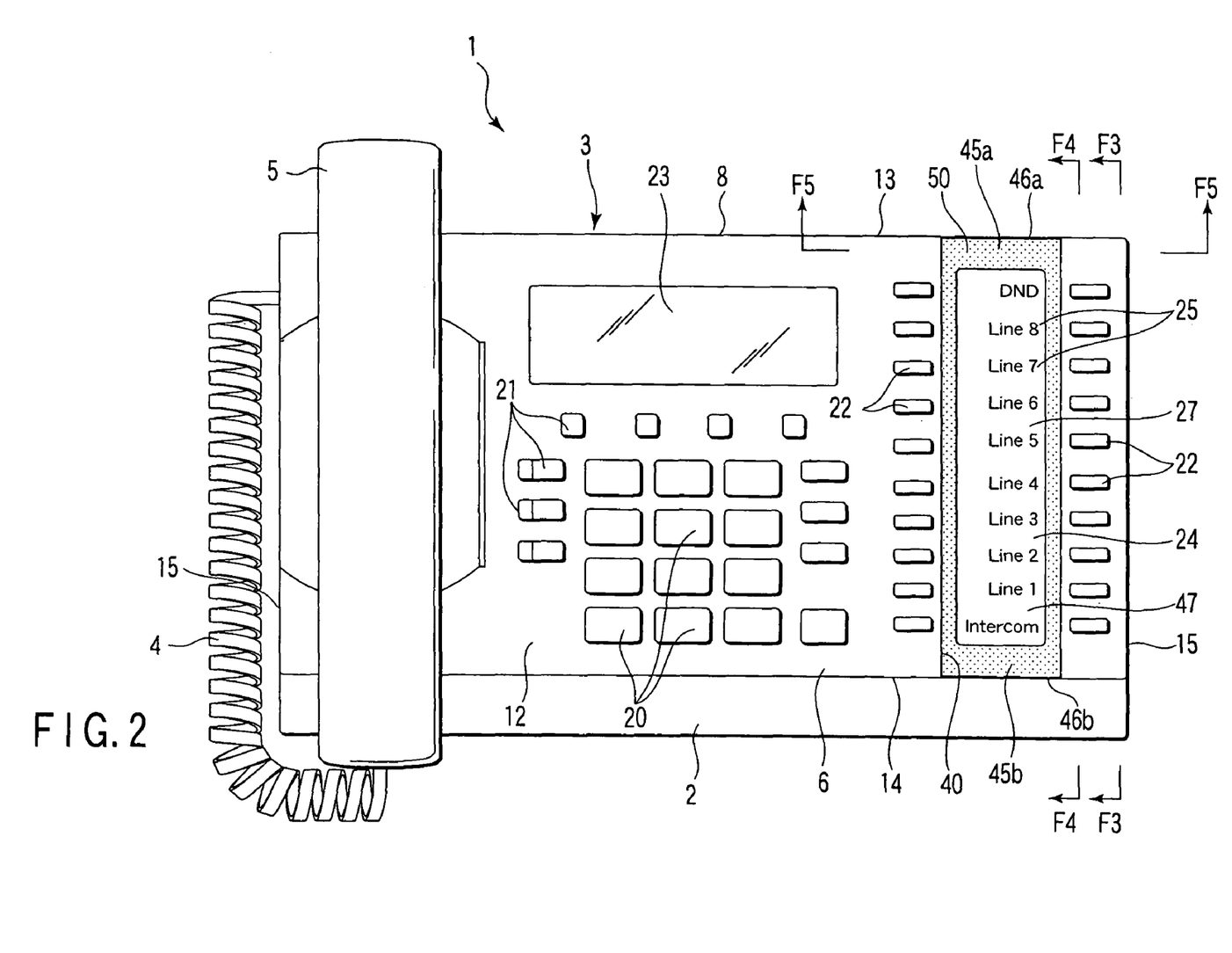
FIG. 2 is an exemplary plan view of the telephone of the embodiment.

FIGS. 1 and 2 show a telephone 1 for general purposes, such as a home or office telephone. The telephone 1 comprises a seat 2, a telephone main body 3 placed on the seat 2, and a handset 5 connected to the main body 3 via a cord 4.

The telephone main body 3 includes a housing 6 formed of a synthetic resin. The housing 6 is formed of a base 7 and top cover 8. The base 7 includes a semicircular leg section 10 placed on the seat 2, and a rectangular bottom 11 formed on and integral with the upper end of the leg section 10. The top cover 8 is a downwardly opening box-shaped component. The top cover 8 has an upper wall 12 as a first wall, a rear wall 13 as a second wall, a front wall 14 as a third wall, and left/right sidewalls 15. The rear wall 13 downwardly extends from the rear edge of the upper wall 12. The front wall 14 downwardly extends from the front edge of the upper wall 12. The rear and front walls 13 and 14 are perpendicular to the upper wall 12 and oppose each other along the lateral axis of the telephone main body 3.

Figure 3:
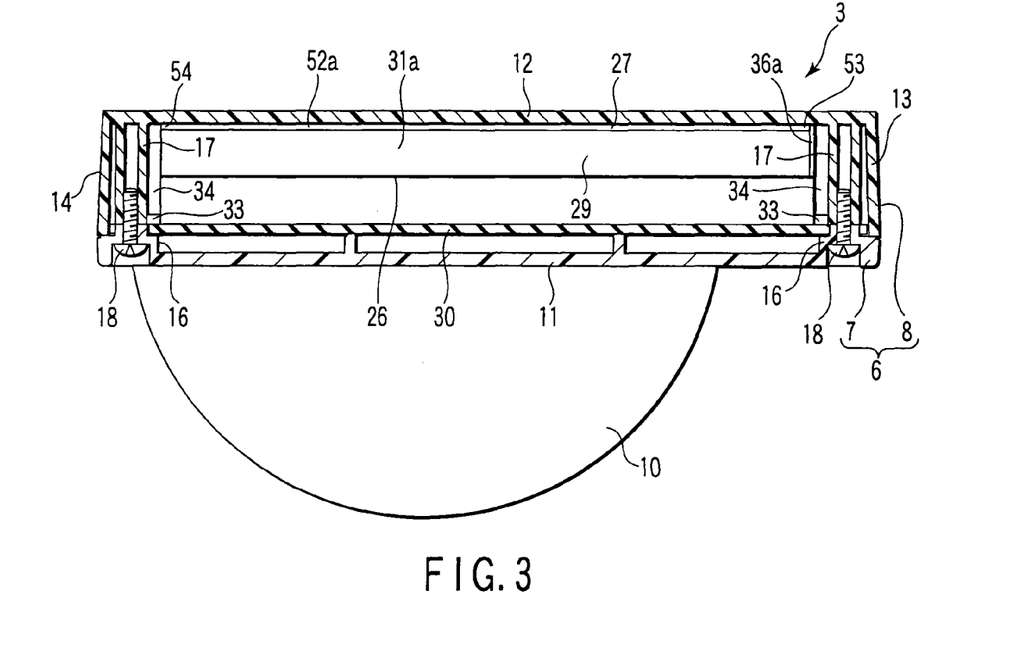
FIG. 3 is an exemplary sectional view taken along line F3-F3 of FIG. 2.
Figure 4:
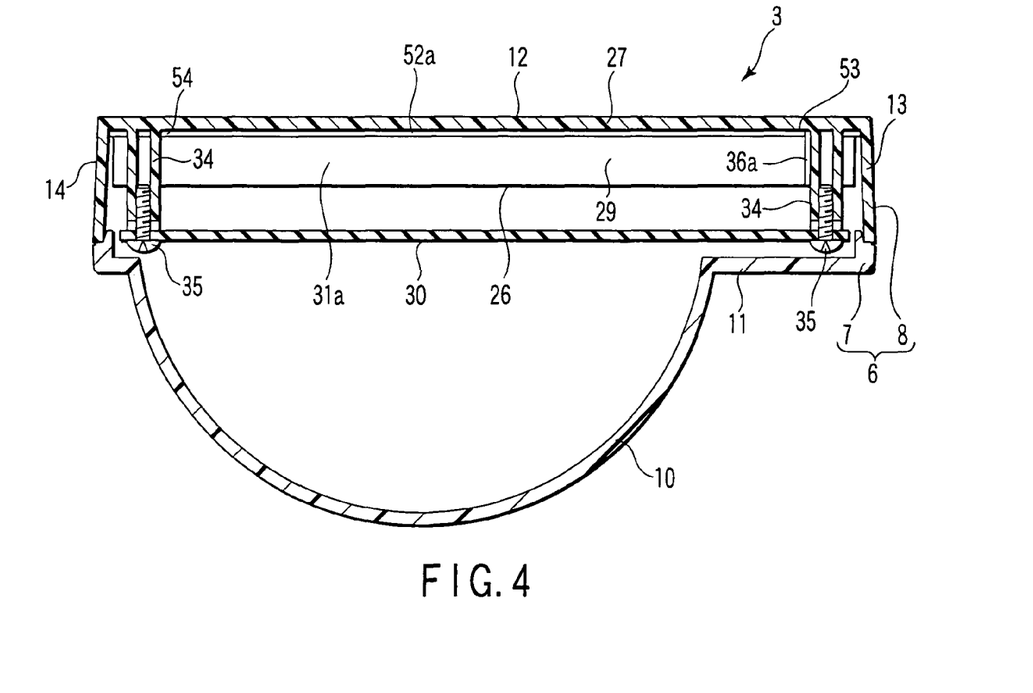
FIG. 4 is an exemplary sectional view taken along line F4-F4 of FIG. 2.

As shown in FIGS. 3 and 4, the top cover 8 is placed on the bottom 11 of the base 7. The lower ends of the rear, front and sidewalls 13, 14 and 15 contact the outer periphery of the bottom 11. The bottom 11 of the base 7 has a plurality of first bosses 16 upwardly projecting from the four corners of the inner surface thereof. The upper wall 12 of the top cover 8 has a plurality of second bosses 17 downwardly projecting from the four corners of the inner surface thereof. The first bosses 16 coaxially abut against the second bosses 17, and are coupled thereto by a plurality of screws 18. In other words, the screws 18 couple the base 7 to the top cover 8.

As shown in FIGS. 1 and 2, the upper wall 12 of the top cover 8 forms the upper surface of the housing 6. A plurality of dial buttons 20, fixed-function buttons 21 and free assign buttons 22 are provided on the upper surface of the housing 6.

The upper surface of the housing 6 is further provided with a first liquid crystal display section 23 and second liquid crystal display section 24. The first liquid crystal display section 23 is used to display, for example, a telephone number, calendar, time, and dialing/incoming states. The first liquid crystal display section 23 is located adjacent to the dial buttons 20 and fixed-function buttons 21.

The second liquid crystal display section 24 is used to display, for example, a plurality of external-line numbers 25 assigned to the free assign buttons 22 arranged in two columns. In the embodiment, the second liquid crystal display section 24 extends between the front and rear ends of the upper surface 12 of the housing 6, and between the two columns of free assign buttons 22.

Figure 6:
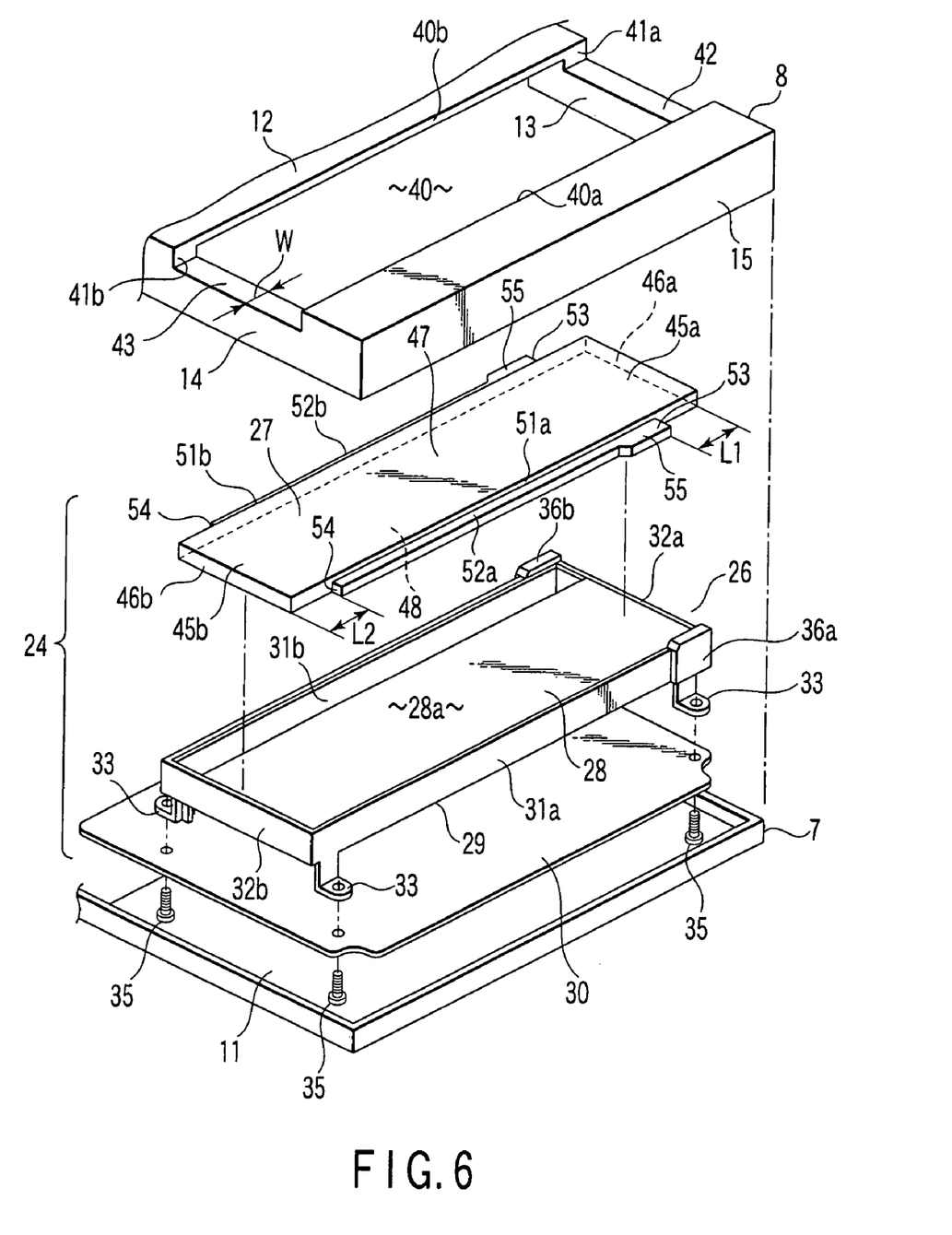
FIG. 6 is an exemplary exploded perspective view illustrating the positional relationship between a top cover, cover panel, liquid crystal display device and base employed in the embodiment.

As shown in FIG. 6, the second liquid crystal display section 24 includes a liquid crystal display device 26 and cover panel 27. The liquid crystal display device 26 is an example of a built-in component, and is contained in the housing 6. The liquid crystal display device 26 comprises a liquid crystal display panel 28, panel holder 29 and printed circuit board 30. The liquid crystal display panel 28 is a rectangular panel extending between the front and rear ends of the upper surface 12, and has a flat display surface 28a for displaying the external-line numbers 25.

The panel holder 29 holds the liquid crystal display panel 28. The panel holder 29 is a frame having a pair of side plates 31a and 31b and a pair of end plates 32a and 32b. The side plates 31a and 31b extend along the lateral axis of the housing 6, while the end plates 32a and 32b extend along the longitudinal axis of the housing 6. The side plates 31a and 31b and end plates 32a and 32b surround and hold the liquid crystal display panel 28. The panel holder 29 has a plurality of leg sections 33 downwardly projecting from the four corners thereof.

Figure 5:
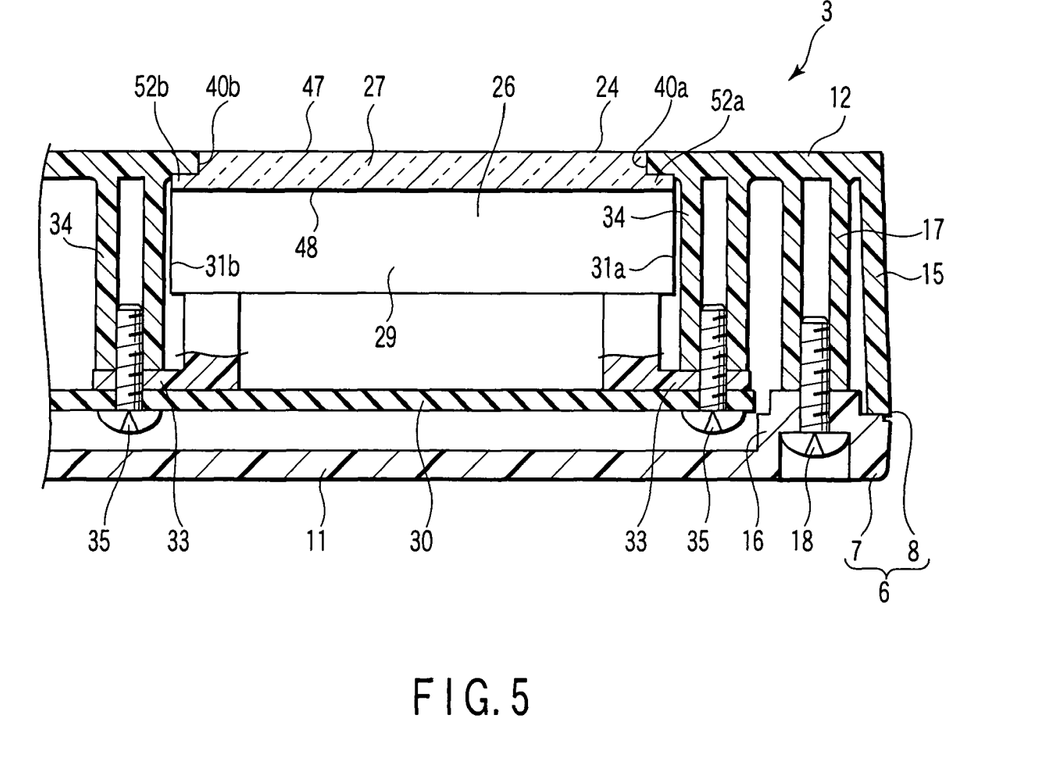
FIG. 5 is an exemplary sectional view taken along line F5-F5 of FIG. 2.

As shown in FIGS. 3 to 5, the printed circuit board 30 is interposed between the bottom 11 of the base 7 and the panel holder 29. The four corners of the printed circuit board 30 are fixed by screws 35 to a plurality of third bosses 34 downwardly projecting from the inner surface of the upper wall 12 of the top cover 8.

The leg sections 33 of the panel holder 29 are interposed between the upper surface of the printed circuit board 30 and the lower surfaces of the bosses 34, and fixed to the top cover 8 along with the printed circuit board 30. Accordingly, the base 7 cooperates with the top cover 8 covering the base 7 to cover the liquid crystal display device 26.

As shown in FIG. 6, the side plates 31a and 31b of the panel holder 29 have engagement sections 36a and 36b, respectively. The engagement sections 36a and 36b are located at respective longitudinal ends of the side plates 31a and 31b, and upwardly and longitudinally project therefrom.

The cover panel 27 is engaged with the upper wall 12 of the top cover 8 so that it covers, from above, the display surface 28a of the liquid crystal display panel 28. The upper wall 12 has an opening 40 at the position corresponding to the liquid crystal display panel 28. The opening 40 crosses the entire upper wall 12 along the lateral axis of the housing 6. Namely, the opening 40 is a rectangular opening extending along the lateral axis of the entire housing 6.

As shown in FIG. 6, the opening 40 is defined by a first side edge 40a and second side edge 40b extending along the lateral axis of the entire housing 6. The opening 40 is further defined by a first end edge 41a and second end edge 41b. The first end edge 41a is apart from the second end edge 41b along the lateral axis of the housing 6.

The first and second side edges 40a and 40b extend in parallel with each other with a certain space defined therebetween along the longitudinal axis of the housing 6. The first end edge 41a is defined by the upper wall 12 and rear wall 13 of the top cover 8. The second end edge 41b is defined by the upper wall 12 and front wall 14 of the top cover 8.

From the above, the rear wall 13 of the top cover 8 includes a first flat support surface 42 which is part of the first end edge 41a. Similarly, the front wall 14 of the top cover 8 includes a second flat support surface 43 which is part of the second end edge 41b.

The cover panel 27 is formed of, for example, a transparent synthetic resin. The cover panel 27 is a rectangular plate fitted in the opening 40 of the top cover 8. As is shown in FIGS. 1, 2 and 6, the cover panel 27 includes a first end portion 45a and second end portion 45b, which are apart from each other along the lateral axis of the housing 6.

The first end portion 45a of the cover panel 27 has a first end face 46a. The first end face 46a is aligned with the first end edge 41a and is seen from the outside of the top cover 8. The first end face 46a is also aligned with the outer surface of the rear wall 13 of the top cover 8. The second end portion 45b of the cover panel 27 has a second end face 46b. The second end face 46b is aligned with the second end edge 41b and is seen from the outside of the top cover 8. The second end face 46b is also aligned with the outer surface of the front wall 14 of the top cover 8.

The cover panel 27 also includes a surface 47 and reverse surface 48. The surface 47 is exposed to the outside of the top cover 8 through the opening 40, and is on a level with the outer surface of the upper wall 12 of the top cover 8. The reverse surface 48 is positioned inside the top cover 8 and opposed to the display surface 28a of the liquid crystal display panel 28. The reverse surface 48 is a flat surface with no projections or depressions.

As shown in FIG. 2, the cover panel 27 has an outer peripheral cover portion 50 covering the portion of the cover panel 27 that is located outside the display surface 28a of the liquid crystal display panel 28. The cover portion 50 is formed by, for example, coating part of the reverse surface 48 of the cover panel 27, or by subjecting, to printing, part of the reverse surface 48. The cover portion 50 surrounds the display surface 28a that is seen through the cover panel 27.

When decoration, such as a pattern or character, is provided on the cover panel 27, it can be done by, for example, coating part of the reverse surface 48 of the cover panel 27, or by subjecting, to printing, part of the reverse surface 48, like the cover portion 50.

As shown in FIG. 6, the cover panel 27 has a pair of side edges 51a and 51b that extend between the first and second end faces 46a and 46b and form the longer sides of the cover panel 27.

The side edges 51a and 51b have flanges 52a and 52b, respectively. The flanges 52a and 52b linearly extend along the side edges 51a and 51b and longitudinally project therefrom.

The flanges 52a and 52b each include an end 53 and the other end 54. The ends 53 of the flanges 52a and 52b are slightly apart from the first end face 46a toward the second end face 46b. Similarly, the other ends 54 of the flanges 52a and 52b are slightly apart from the second end face 46b toward the first end face 46a.

Extensions 55 are formed at the ends 53 of the flanges 52a and 52b. The extensions 55 longitudinally project from the side edges 51a and 51b. Accordingly, the ends 53 of the flanges 52a and 52b are larger than the other ends 54.

As shown in FIG. 5, the flanges 52a and 52b of the cover panel 27 are interposed along the thickness of the housing 6 between the side plates 31a and 31b of the panel holder 29 and the inner surface of the upper wall 12. Thus, the flanges 52a and 52b of the cover panel 27 position the cover panel 27 lengthways and thicknessways with respect to the housing 6.

As shown in FIGS. 3 and 4, the ends 53 of the flanges 52a and 52b of the cover panel 27 abut against the engagement sections 36a and 36b of the panel holder 29. Further, the other ends 54 of the flanges 52a and 52b abut against the inner surfaces of the corners defined by the upper wall 12 and front wall 14 of the top cover 8.

Thus, the flanges 52a and 52b extend along the lateral axis of the housing 6 and are held between the engagement sections 36a and 36b of the panel holder 29 and the corners of the top cover 8. As a result, the cover panel 27 is positioned widthways with respect to the housing 6.

A description will now be given of a procedure of fixing the cover panel 27 to the top cover 8.

Figure 7:
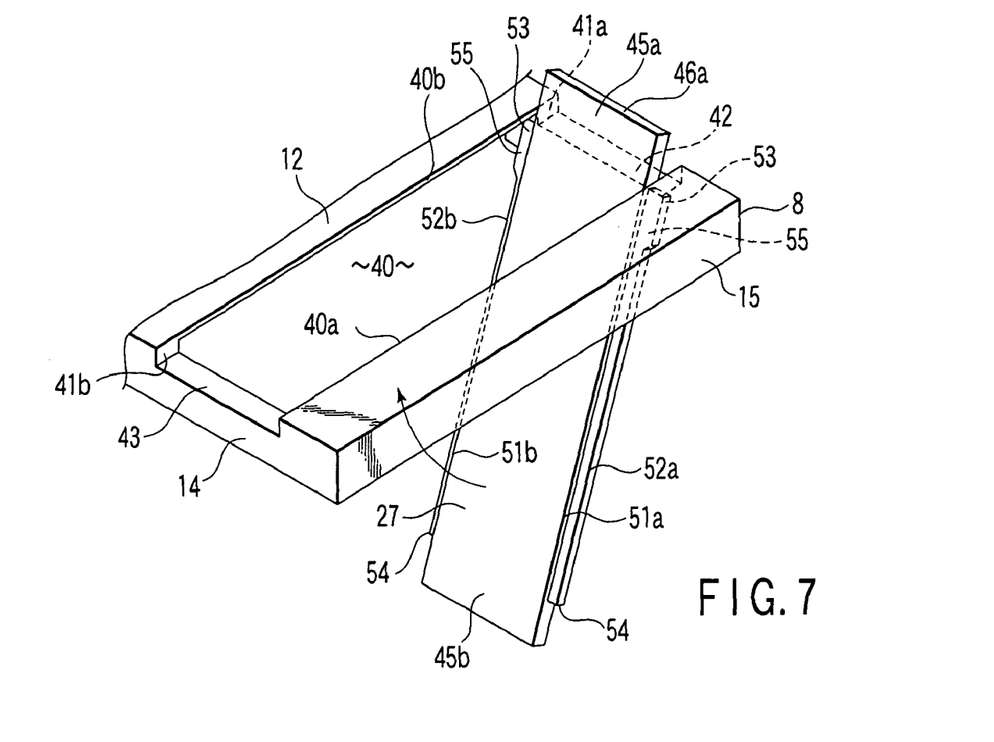
FIG. 7 is an exemplary perspective view illustrating a state in which the cover panel is inserted in an opening formed in the top cover, and an end of the flange of the cover panel is made to abut against the top cover.

Firstly, the top cover 8 and base 7 are kept apart from each other. Subsequently, as shown in FIG. 7, the cover panel 27 is stood so that the first end face 46a of the cover panel 27 will be upwardly directed. Namely, the cover panel 27 is inclined with the first end face 46a upwardly directed, and is inserted into the opening 40 from below the top cover 8.

As a result, the first end portion 45a of the cover panel 27 projects from the upper wall 12 through the opening 40, and the ends 53 of the flanges 52a and 52b of the cover panel 27 abut against the first and second side edges 40a and 40b. It is desirable that the ends 53 of the flanges 52a and 52b of the cover panel 27 should abut against the first and second side edges 40a and 40b at positions as closest to the first end edge 41a as possible.

After that, as indicated by the arrow in FIG. 7, the cover panel 27 is rotated toward the opening 40, using the ends 53 of the flanges 52a and 52b as supporting points. As a result, the cover panel 27 is fitted in the opening 40 from inside the top cover 8, and the first end edge 45a of the cover panel 27 is placed on the first support surface 42.

Figure 8:
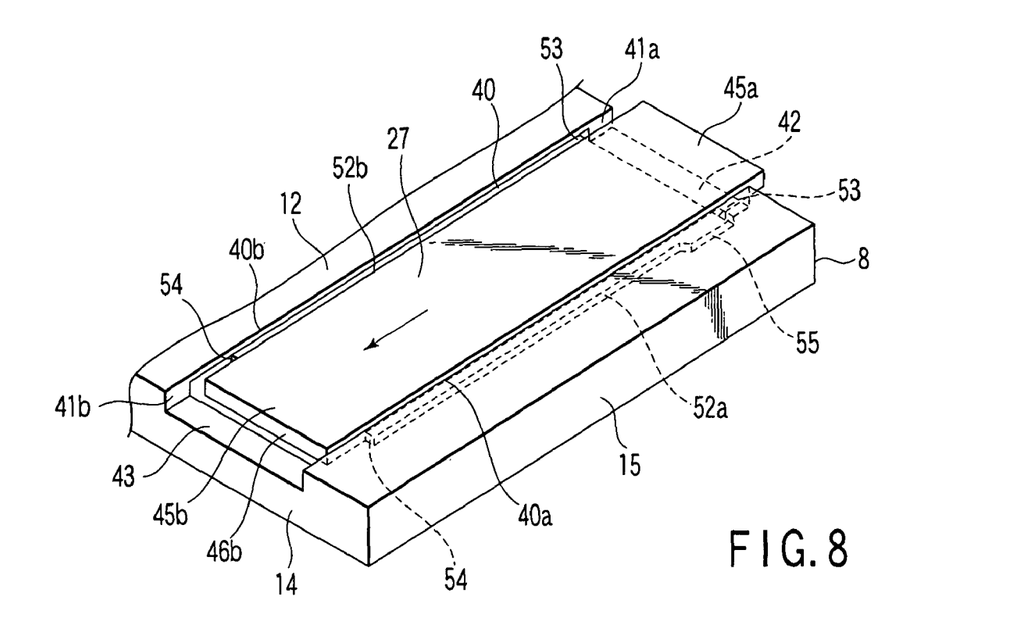
FIG. 8 is an exemplary perspective view illustrating a state in which the cover panel is fitted in the opening of the top cover.

When the cover panel 27 is fitted in the opening 40, the first end edge 45a of the cover panel 27 still outwardly projects from the top cover 8, as is shown in FIG. 8. At the same time, the second end edge 45b of the cover panel 27 is disengaged from the second support surface 43 and retracts from the front wall 14 of the top cover 8 inside the opening 40.

Therefore, the cover panel 27 is then slid toward the second end edge 45b as indicated by the arrow of FIG. 8, thereby placing the second end edge 45b on the second support surface 43. As this time, the cover panel 27 bridges the first support surface 42 of the rear wall 13 and the second support surface 43 of the front wall 14, and the surface 47 of the cover panel 27 on a level with the outer surface of the upper wall 12.

When the cover panel 27 is further slid toward the second end face 46b, the other ends 54 of the flanges 52a and 52b abut against the inner surfaces of the corners formed by the upper wall 12 and front wall 14 of the top cover 8. In this state, the first end face 46a of the cover panel 27 is on a level with the outer surface of the rear wall 13 of the top cover 8. Similarly, the second end face 46b of the cover panel 27 is on a level with the outer surface of the front wall 14 of the top cover 8.

Lastly, the printed circuit board 30 and panel holder 29 are fixed together to the third bosses 34 of the top cover 8 by the screws 35. As a result, the flanges 52a and 52b of the cover panel 27 are held between the side plates 31a and 31b of the panel holder 29 and the inner surface of the upper wall 12.

At the same time, the engagement sections 36a and 36b provided at ends of the side plates 31a and 31b are brought into contact with the ends 53 of the flanges 52a and 52b. In the embodiment, the ends 53 of the flanges 52a and 52b are greater by the extensions 55 than the other ends 54 of the flanges 52a and 52b. Accordingly, the engagement sections 36a and 36b of the panel holder 29 reliably contact the ends 53 of the flanges 52a and 52b.

As a result, the flanges 52a and 52b of the cover panel 27 are held between the engagement sections 36a and 36b of the panel holder 29 and the corners of the top cover 8.

Thus, the cover panel 27 is positioned thicknessways, widthways and lengthways with respect to the top cover 8, and fitted in the opening 40 of the top cover 8. This is the termination of the attachment operations of the cover panel 27.

As described above, the cover panel 27 is rotated and inserted into the opening 40 of the top cover 8, and then slid in the opening 40. As a result, the first and second end faces 46a and 46b are aligned with the first and second end edges 41a and 41b of the opening 40, respectively, such that they can be seen from the outside of the top cover 8.

To enable such a movement of the cover panel 27 as above, it is necessary to satisfy W+L2<L1 (see FIG. 6), where W is the width of the second support surface 43 of the top cover 8, L1 is the distance between the first end face 46a of the cover panel 27 and the end 53 of each extension 55, and L2 is the distance between the second end face 46b of the cover panel 27 and the other end 54 of each flange 52a, 52b.

If L1 is smaller than W+L2, the second end portion 45b of the cover panel 27 collides with the front wall 14 of the top cover 8 when the cover panel 27 is rotated toward the opening 40. Accordingly, the cover panel 27 cannot be fitted into the opening 40.

In the embodiment, the flanges 52a and 52b of the cover panel 27 are held, thicknessways with respect to the housing 6, between the side plates 31a and 31b of the panel holder 29 and the upper wall 12 of the top cover 8. At the same time, the flanges 52a and 52b are held, widthways with respect to the housing 6, between the corners formed by the upper and front walls 12 and 14 of the top cover 8, and the engagement sections 36a and 36b of the panel holder 29.

Thus, the cover panel 27 is positioned thicknessways, lengthways and widthways with respect to the housing 6. Namely, the cover panel 27 is fixed to the top cover 8 of the housing 6, fitted in the opening 40.

Since, in the embodiment, the cover panel 27 is fixed to the top cover 8 using the panel holder 29, dedicated fitting, such as an adhesive or fixing claw, are not necessary. This enables the fixed portion of the cover panel 27 to have a good outward appearance, and is also advantageous in cost.

Furthermore, since it is not necessary to provide a fixing claw on the reverse surface 48 of the cover panel 27, the reverse surface 48 can be formed flat. This enables the reverse surface 48 to be directly subjected to printing or coating to form the cover portion 50. This means that no dedicated masking sheet or decoration sheet is necessary, and hence the number of required components can be reduced, thereby further reducing the cost of the telephone 1.

In addition, since the flanges 52a and 52b of the cover panel 27 are covered with the upper wall 12 of the top cover 8, the fixed portion of the cover panel 27 cannot be seen from the outside of the telephone 1. This enables the portion including the top cover 8 and cover panel 27 to be designed uniquely, along with the effect of intentionally exposing the first and second end faces 46a and 46b of the cover panel 27 to the outside of the top cover 8. Thus, the second liquid crystal display section 24 can be designed uniquely.

The invention is not limited to the above-described embodiment, but may be modified in various ways without departing the scope.

In the embodiment, the built-in component contained in the housing and opposing the cover panel is a liquid crystal display device. However, the invention is not limited to this. The built-in component may be a battery or detachable card. The invention is applicable to arbitrary components that are required to be seen from the outside of the housing.

Further, the panel attachment assembly of the invention is applicable to electronic devices, such as portable information terminal devices, as well as telephones.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A panel attachment assembly for a telephone housing comprising: the housing including a first wall with an opening formed therein, a second wall extending from an end of the first wall and intersecting the first wall, and a third wall extending from another end of the first wall and intersecting the first wall, the opening being formed by a first end edge defined by the first and second walls, and a second end edge defined by the first and third walls; a cover panel fitted in the opening, the cover panel including a first end face aligned with the first end edge and seen from an outside of the housing, and a second end face aligned with the second end edge and seen from the outside of the housing; and a built-in component contained in and fixed to the housing and opposing the cover panel within the housing, wherein: the cover panel further includes a pair of side edges extending between the first and second end faces, and flanges projecting from the side edges and positioned between the first wall of the housing and the built-in component, and the flanges of the cover panel are covered with the first wall, the built-in component having engagement sections at positions corresponding to ends of the flanges; and the ends of the flanges contact the engagement sections between the first wall and the built-in component, other ends of the flanges contacting the housing between the first wall and the built-in component.

2. The panel attachment assembly according to claim 1, wherein the first end face of the cover panel is aligned with an outer surface of the second wall, and the second end face of the cover panel is aligned with an outer surface of the third wall.

3. The panel attachment assembly according to claim 1, wherein the cover panel further includes a surface exposing through the opening of the housing, and a flat reverse surface opposing the built-in component.

4. The panel attachment assembly according to claim 3, wherein the built-in component is a liquid crystal display device, and the cover panel is transparent.

5. The panel attachment assembly according to claim 3, wherein the surface of the cover panel is on a level with an outer surface of the first wall.

6. The panel attachment assembly according to claim 1, wherein:
when the cover panel is inserted into the opening from inside the housing, with the first end face upwardly directed, the ends of the flanges are brought into contact with an inner surface of the first wall of the housing;
when the cover panel is rotated about the ends of the flanges, the cover panel is fitted into the opening from inside the housing; and
when the cover panel fitted in the opening is slid toward the second end face, the cover panel bridges the second wall and the third wall of the housing with other ends of the flanges kept in contact with the third wall of the housing.

7. The panel attachment assembly according to claim 6, wherein:
the cover panel includes a first end portion with the first end face, and a second end portion with the second end face;
the ends of the flanges are horizontally slightly apart from the first end face of the cover panel, and the other ends of the flanges are horizontally slightly apart from the second end face of the cover panel;
the second wall of the housing includes a first support surface on which the first end portion of the cover panel is slidably placed, and the third wall of the housing includes a second support surface on which the second end portion of the cover panel is slidably placed; and $$W+L2<L1$$

where W is a width of the second support surface, L1 is a distance between the first end face of the cover panel and each of the ends of the flanges, and L2 is a distance between the second end face of the cover panel and each of the other ends of the flanges.

8. The panel attachment assembly according to claim 6, wherein the built-in component is fixed to the housing when the other ends of the flanges are in contact with the third wall of the housing, and the flanges are held between the engagement sections of the built-in component and the third wall of the housing.

9. The panel attachment assembly according to claim 1, wherein the housing further includes a top cover having the first to third walls, and a base covered with the top cover, the built-in component being fixed to the top cover and covered with the top cover and the base.

10. A panel attachment method of fitting a cover panel in an opening formed in a telephone housing, the housing including a first wall with the opening formed therein, a second wall extending from an end of the first wall and intersecting the first wall, and a third wall extending from another end of the first wall and intersecting the first wall, the opening being formed by a first end edge defined by the first and second walls, and a second end edge defined by the first and third walls, and the cover panel including a first end face aligned with the first end edge and seen from an outside of the housing, and a second end face aligned with the second end edge and seen from the outside of the housing, and flanges projecting from side edges extending between the first and second end faces of the cover panel, the method comprising: inserting the cover-panel into the opening from inside the housing, with the first end face upwardly directed, and bringing the ends of the flanges into contact with an inner surface of the first wall of the housing; rotating the cover panel about the ends of the flanges, and fitting the cover panel into the opening from inside the housing; sliding the cover panel, fitted in the opening, toward the second end face, thereby causing the cover panel to bridge the second wall and the third wall of the housing, with other ends of the flanges kept in contact with the housing; and fixing a built-in component to an inner surface of the housing with the flanges interposed between the built-in component and the first wall of the housing, and bringing the ends of the flanges into contact with the built-in component between the first wall and the built-in component, thereby horizontally holding the flanges between the built-in component and the housing.

11. The method according to claim 10, wherein when the flanges of the cover panel are held between the housing and the built-in component, the first end face of the cover panel is aligned with an outer surface of the second wall, and the second end face of the cover panel is aligned with an outer surface of the third wall.

12. A telephone comprising:
a telephone main body including a first wall with an opening formed therein, a second wall extending from an end of the first wall and intersecting the first wall, and a third wall extending from another end of the first wall and intersecting the first wall, the opening being formed by a first end edge defined by the first and second walls, and a second end edge defined by the first and third walls;
a transparent cover panel fitted in the opening, the cover panel including a first end face aligned with the first end edge and seen from an outside of the telephone main body, and a second end face aligned with the second end edge and seen from the outside of the telephone main body; and
a display device contained in the telephone main body and having a display surface that opposes the cover panel within the telephone main body,
wherein:
the cover panel further includes a pair of side edges extending between the first and second end faces, and flanges projecting from the side edges and positioned between the first wall of the telephone main body and the display device, and the flanges of the cover panel are covered with the first wall, the display device having engagement sections at positions corresponding to ends of the flanges; and
the ends of the flanges contact the engagement sections between the first wall and the display device, and other ends of the flanges contact the telephone main body between the first wall and the display device.

13. The telephone according to claim 12, wherein the first end face of the cover panel is aligned with an outer surface of the second wall, and the second end face of the cover panel is aligned with an outer surface of the third wall.

14. The telephone according to claim 12, wherein the cover panel further includes a surface exposing through the opening of the telephone main body, and a flat reverse surface opposing the display surface.

15. The telephone according to claim 12, wherein the display device includes a display panel with the display surface, and a holder holding the display panel, and the holder is fixed to an inner surface of the first wall of the telephone main body to hold the cover panel therebetween.

16. The telephone according to claim 15, wherein the holder includes the engagement sections.

* * * * *